(12) United States Patent
Stehle

(10) Patent No.: US 8,449,433 B2
(45) Date of Patent: May 28, 2013

(54) CLUTCH DEVICE

(75) Inventor: Bjoern Stehle, Buehlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/445,549

(22) Filed: Apr. 12, 2012

(65) Prior Publication Data

US 2012/0199436 A1 Aug. 9, 2012

Related U.S. Application Data

(63) Continuation of application No. PCT/DE2010/001158, filed on Sep. 30, 2010.

(30) Foreign Application Priority Data

Oct. 15, 2009 (DE) .......................... 10 2009 049 511

(51) Int. Cl.
*F16D 48/00* (2006.01)
*F16D 66/00* (2006.01)

(52) U.S. Cl.
USPC ........................... 477/174; 192/30 W; 701/68

(58) Field of Classification Search
None
See application file for complete search history.

(56) References Cited

U.S. PATENT DOCUMENTS

| | | | |
|---|---|---|---|
| 5,119,913 A * | 6/1992 | Focqueur et al. | 192/111.12 |
| 2004/0188218 A1 | 9/2004 | Berger et al. | |
| 2006/0190142 A1 * | 8/2006 | Katrak et al. | 701/1 |
| 2008/0215219 A1 * | 9/2008 | Porzel et al. | 701/68 |
| 2010/0152985 A1 * | 6/2010 | Petzold et al. | 701/68 |

FOREIGN PATENT DOCUMENTS

| | | | |
|---|---|---|---|
| DE | 199 15 832 A1 | | 7/2000 |
| DE | 100 65 023 A1 | | 7/2002 |
| DE | 10 2006 037 958 A1 | | 2/2008 |
| DE | 10 2007 024 794 A1 | * | 11/2008 |
| EP | 1 770 313 A2 | | 4/2007 |
| GB | 2 458 502 A | | 9/2009 |
| WO | 00/73682 A1 | | 12/2000 |
| WO | WO 2005/093277 A1 | * | 10/2005 |

* cited by examiner

*Primary Examiner* — Rodney Bonck

(74) *Attorney, Agent, or Firm* — Lucas & Mercanti, LLP

(57) ABSTRACT

A clutch device, which has at least one clutch, which can assume an open operating state and a closed operating state, in which a torque can be transmitted by the clutch, an actuator device for activating the clutch, and a sensor device, which has a motion sensor. In order to simplify the actuation strategy of the clutch device, the sensor device has an additional sensor, which detects whether the actuator device is in or near an actuator end position in which the clutch is in the open operating state thereof.

5 Claims, No Drawings

CLUTCH DEVICE

CROSS-REFERENCE TO RELATED APPLICATIONS

This application is a continuation of PCT/DE2010/001158 filed Sep. 30, 2010 which in turn claims the priority of DE 10 2009 049 511.8 filed Oct. 15, 2009. The priority of these applications is hereby claimed and these applications are incorporated by reference herein

FIELD OF THE INVENTION

The invention relates to a clutch device, which has at least one clutch that can assume an open and a closed operating state and permit a torque to be transmitted by the clutch, an actuator device for actuating the clutch, and a sensor device, which has a movement sensor. Furthermore, the invention relates to a method for actuating and/or operating a clutch device of this type.

BACKGROUND OF THE INVENTION

The international publication WO 00/73682 A1 has disclosed a clutch with an actuator, the movement of which is detected by way of a clutch travel sensor.

SUMMARY OF THE INVENTION

It is an object of the invention to simplify the actuating strategy of a clutch device.

The object is achieved by the clutch device of the invention, which comprises at least one clutch which can assume an open and a closed operating state, in which a torque can be transmitted by the clutch, an actuator device for actuating the clutch, and a sensor device, which comprises a movement sensor and an additional sensor that detects whether the actuator device is situated in or near an actuator end position so that when the actuator device is situated in the actuator end position, the clutch is in the open operating state. The clutch is engaged in its closed operating state. The clutch is disengaged in its open operating state. The clutch is preferably a friction clutch. The clutch device according to the invention preferably comprises two clutches, in particular two friction clutches, in one embodiment, the dual clutch is assigned to a parallel shift transmission in the drive train of a motor vehicle. The additional sensor can determine clearly and reliably in a simple way whether the clutch is open, This affords the advantage that complicated actuating strategies for the reliable determination of the actuator position can be dispensed with.

In another exemplary embodiment of the clutch device, the additional sensor is configured as a limit switch, The limit switch supplies, as output signal, preferably merely the information that the clutch is open if the switch is active. If the switch is inactive, the additional sensor which is configured as a limit switch supplies the information that the clutch is not open.

In a further exemplary embodiment of the clutch device, the additional sensor is configured as an absolute movement sensor with a relatively small detection region near the actuator end position of the actuator device. The absolute movement sensor makes an absolute travel measurement possible near the actuator end position, for example on a magnetic basis.

In a further exemplary embodiment of the clutch device, the actuator device comprises a lever actuator which can be actuated by an electric motor, The electric motor is preferably configured as an EC motor. Here, EC means that the electric motor is electronically commutated.

In a further exemplary embodiment of the clutch device, the clutch is of self-opening configuration. This means that the clutch opens when the electric motor is switched off and the actuator moves into its actuator end position. In order to protect the actuator system, the actuator can additionally contain a unit which limits the force acting on the actuator components in an opening operation of this type. This unit can comprise a slipping clutch.

In a further exemplary embodiment of the clutch device, a control device is integrated with the sensor device into the actuator device. The control device is, for example, a control unit which serves to make it possible to perform basic functions which are required for the operation of the actuator, for example position controllers, directly on the actuator and therefore separately from a central control unit.

The invention also relates to a method for actuating and/or operating an above-described clutch device. The object specified above is alternatively or additionally achieved by the fact that the additional sensor is used to detect whether the actuator device is situated in or near the actuator end position, in which the clutch is situated in its open operating state. This affords the advantage that the operational readiness can be produced independently of a defined driving situation and without a time delay.

In one exemplary embodiment of the method, after the ignition is switched on and/or a control unit or the control device is reset, a signal of the additional sensor is read out, in order to ensure that the actuator device is situated in or near the actuator end position, in which the clutch is situated in its open operating state. The signal contains, for example, merely the information that the clutch is open, or that the clutch is not open.

In a further exemplary embodiment of the method, a check is made as to whether an actuator end position information item which is detected with the aid of the movement sensor corresponds with the signal of the additional sensor; if there is no correspondence, a calibration operation is carried out. If there is correspondence, a calibration operation is not required.

In a further exemplary embodiment of the method, the actuator is moved with a relatively great force in the direction of the actuator end position if the result of the signal of the additional sensor is that the actuator device is not situated in or near the actuator end position, in which the clutch is situated in its open operating state. The additional sensor detects in good time when the actuator has reached its actuator end position. A plausibility check of the information that the clutch is open can be dispensed with completely. As a result, the control outlay can be reduced considerably.

DETAILED DESCRIPTION OF THE INVENTION

Further advantages, features and details of the invention result from the following description, in which various exemplary embodiments are described in detail.

The clutch device according to the invention is assigned in a drive train of a motor vehicle to a transmission, which is preferably configured as a parallel shift transmission. The clutch device preferably comprises two friction clutches. In order to actuate the friction clutches, lever actuators with EC motors are used to engage the friction clutches. Said motors are distinguished by the fact that Hall sensors are used for the electronic commutation, the signal of which Hall sensors can be used at the same time for the detection of an incremental motor and therefore actuator position.

The actuators and the associated friction clutches are preferably configured in such a way that the entire system is self-opening, that is to say the clutch opens when the motor is switched off in the actuator and the actuator moves into an actuator end position, which is also called a stop or end stop, in the clutch-open direction. In order to protect the actuator system, the actuator can additionally contain a unit which limits the force acting on the actuator components during an opening operation of this type, for example a slipping clutch.

A control device, for example a control unit, is integrated into the actuator, in order for it to be possible to perform basic functions which are required for the operation of the actuator, for example position controllers, directly on site and therefore separately from a central control unit.

The present invention provides a redundant and simple sensor system for detecting the clutch-open position in the clutch actuator. The sensor system can comprise a simple limit switch which supplies as output merely the information "clutch-open position reached," that is to say limit switch active, or the information "clutch-open position not reached," that is to say limit switch inactive. The sensor system can also be configured, for example on a magnetic basis, in such a way that it makes an absolute travel measurement possible in a small region near the actuator end position.

After the ignition of the motor vehicle is switched on or a control unit is reset, the limit switch information is read out and it is therefore ensured that the clutch actuator is completely open. If the absolute position which is determined from the incremental travel measurement corresponds in this case with the expected position, a calibration operation is not required. Otherwise, a calibration operation is carried out, it being possible, however, to dispense with the application of a high voltage, since the end position which is also called an end stop or a stop has clearly been reached.

In the case of the use of an absolute travel measurement in a small region near the end location or end position of the actuator, an otherwise required referencing function can be dispensed with, since an exact calibration operation can be carried out on the basis of the supplied absolute position in the region of the end stop.

If the clutch is not open in one of the above-described cases, first of all the actuator can be moved in the open direction with great force, since the reaching of the end stop or the end position is indicated in good time by the above-described sensor system which is also called an additional sensor system and comprises the additional sensor. A plausibility check can be dispensed with completely, since the correct calibration position is ensured by the additional sensor system.

The overall result of this is a considerably reduced control outlay and a considerably shortened time delay until operational readiness. As a result, the operational readiness can be produced again immediately in every situation.

The invention claimed is:

1. A method for actuating and/or operating a clutch device that comprises at least one clutch, which can assume an open operating state and a closed operating state and which can transmit a torque, an actuator device for actuating the clutch, and a redundant sensor device for the actuator device having a movement sensor and an additional sensor, the additional sensor detects only whether the actuator device is situated in or near an actuator end position, the method comprising the following method steps:
    detecting, by using the additional sensor of the redundant sensor device, whether the actuator device is situated in or near the actuator end position in which the clutch is in the open operating state; and
    checking whether an actuator end a position information item, which is detected with aid of the movement sensor, corresponds with the signal of the additional sensor, and carrying out a calibration operation if there is no correspondence.

2. The method as claimed in claim 1, further involving reading out a signal from the addition& sensor after an ignition is switched on and/or a control device is reset to ensure that the actuator device is situated in or near the actuator end position.

3. The method as claimed in claim 1, including moving the actuator with a substantially great force in a direction of the actuator end position if the signal of the additional sensor indicates that the actuator device is not situated in or near the actuator end position.

4. The method as claimed in claim 1, wherein the additional sensor is a limit switch.

5. The method as claimed in claim 1, wherein the additional sensor is an absolute movement sensor with a small detection region near the actuator end position of the actuator device.

\* \* \* \* \*